Aug. 27, 1963 R. C. CURRY 3,102,258
BINARY CODE TO ANALOG CONVERTER
Filed Oct. 12, 1959
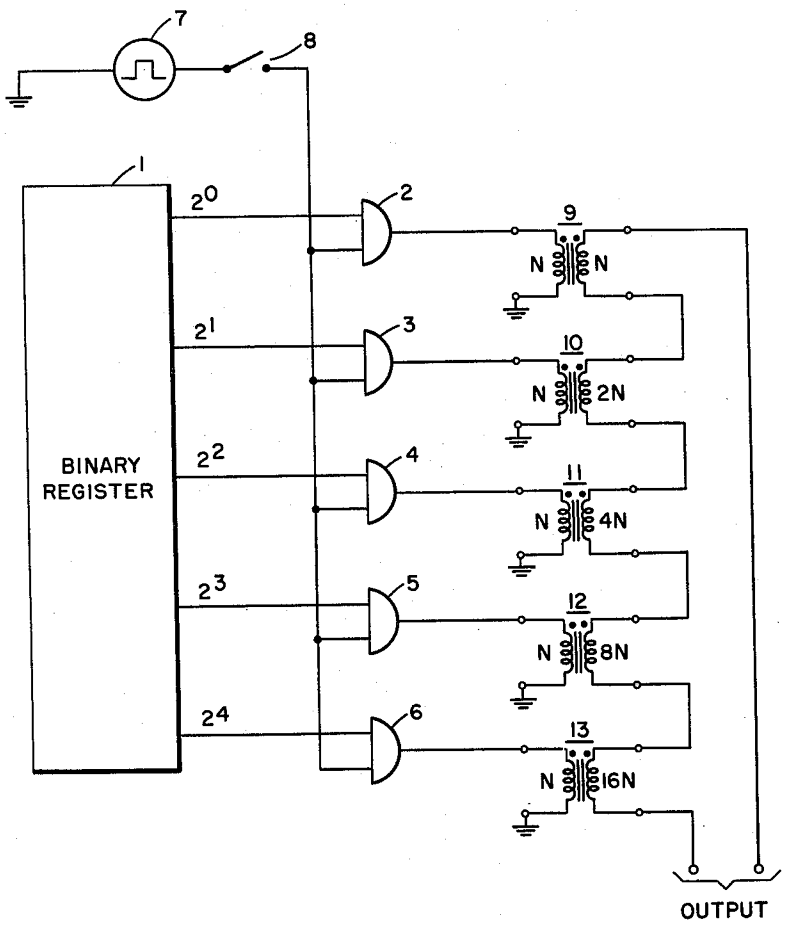
*INVENTOR.*
ROBERT C. CURRY
*BY* F. H. Henson
ATTORNEY 3,102,258
Patented Aug. 27, 1963

3,102,258

BINARY CODE TO ANALOG CONVERTER

Robert C. Curry, Rochester, N.Y., assignor to General Dynamics Corporation, Rochester, N.Y., a corporation of Delaware Filed Oct. 12, 1959, Ser. No. 845,672
3 Claims. (Cl. 340—347)

The present invention relates in general to code converters and, more particularly, to binary code to analog converters.

It is the general object of this invention to provide a new and improved code converter.

It is a more particular object of this invention to provide a new and improved converter for converting a binary code to an analog representation corresponding to the decimal value of the binary code.

The present invention accomplishes the above cited objects by providing N transformers individually corresponding to the bits of a N bit binary code. Each transformer has a primary winding and a secondary winding with the number of turns on the secondary winding being related to the number of turns on the primary winding in the ratio of the decimal value of the corresponding bit to one. The secondary windings of all of the transformers are connected in series aiding relationship and equal valued signals are simultaneously applied to the primary windings of the transformers corresponding to "1" bits.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows a binary code to analog converter.

Referring to the drawing, it can be seen that the binary register 1, which may be of any well known type, has a capacity of five bits of information. As is well known in the art, each bit may be either a "0" or a "1" depending upon the value of the particular code stored. For example, if the stored binary code is 00001, which corresponds to the decimal digit "1," the signal on conductor $2^0$ is a "1" while the signal on each of the other conductors $2^1$–$2^4$ is a "0," while if the binary code is 01010, which corresponds to the decimal digit "10," the signal on each of the conductors $2^1$ and $2^3$ is a "1" while the signal on each of the conductors $2^0$, $2^2$, and $2^4$ is a "0." In the disclosed embodiment of the invention, a "1" signal is positive with respect to a "0" signal. Each of the output conductors $2^0$–$2^4$ is individually connected to the upper input terminal to one of the AND gates 2–6 and if the signal on a particular output conductor is a "1," the corresponding gate is enabled to pass a positive-going readout signal received from pulse generator 7 and which is applied to the lower terminal of each of the AND gates 2–6 when switch 8 is operated.

The output of each of the gates 2–6 is individually connected to the primary winding of one of the transformers 9–13 which individually correspond to the bits of the binary code to be converted. The number of turns on the secondary winding of each transformer is related to the number of turns on the primary winding of that transformer in the ratio of the decimal value of the corresponding bit to one. For example, the turns ratio on transformer 9 is one to one since transformer 9 corresponds to the bit $2^0$, while the turns ratio on transformer 13 is sixteen to one since transformer 13 corresponds to the bit $2^4$. Because of the turns ratio used, when a signal is coupled through the corresponding gate to the primary winding of a particular transformer, the voltage induced in the secondary winding of that transformer is proportional to the decimal value of the corresponding bit.

To illustrate the operation of the converter, assume that binary register 1 is in the setting 01010, which corresponds to decimal bit "10." When switch 8 is closed, the positive-going signal generated by pulse generator 7 is coupled through enabled gates 3 and 5 to the primary windings of transformers 10 and 12, respectively. If the value of the signal coupled to the primary windings of the transformers 10 and 12 is N, a signal of value 2N is induced in the secondary winding of transformer 10 and a signal of value 8N is induced in the secondary winding of transformer 12. Since the secondary windings are connected in series aiding relationship, a signal having a value 10N appears across the output terminals.

While there has been shown and described what is at present considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a converter for converting a N bit binary code in which each bit of the code is either a "0" or a "1" to an analog representation, a winding corresponding to each bit of said code, means for permanently connecting all said windings in series aiding relationship, pulse generating means, and means coupled to said pulse generating means for simultaneously inducing only in each winding corresponding to a "1" bit a voltage pulse having an amplitude proportional to the decimal value of that bit in response to a pulse from said pulse generating means.

2. In a converter for converting a N bit binary code to an analog representation, N transformers individually corresponding to the bits of said code, each of said transformers having a primary winding and a secondary winding with the number of turns on the secondary winding being related to the number of turns on the primary winding in the ratio of the decimal value of the corresponding bit of said code to one, means for permanently connecting all said secondary windings in series aiding relationship, pulse generating means and means coupled to said pulse generating means and controlled by a particular code to be converted for simultaneously applying equal valued pulses to the primary windings of certain ones of said transformers in response to a pulse from said pulse generating means, whereby the total voltage induced in said series connected secondary windings is proportional to the decimal value of said particular code.

3. In a converter for converting a N bit binary code in which each bit of the code is either a "0" or a "1" to an analog representation, N transformers individually corresponding to the bits of said code, each of said transformers having a primary winding and a secondary winding with the number of turns on the secondary winding being related to the number of turns on the primary winding in the ratio of the decimal value of the corresponding bit of said code to one, means for permanently connecting all said secondary winding in series aiding relationship, pulse generating means, and means coupled to said pulse generating means for simultaneously applying equal valued pulses to the primary windings of the transformers corresponding to "1" bits in response to a pulse from said pulse generating means.

References Cited in the file of this patent

UNITED STATES PATENTS

| | | |
|---|---|---|
| 2,736,881 | Booth | Feb. 28, 1956 |
| 2,738,504 | Gray | Mar. 13, 1956 |
| 2,916,734 | Spencer | Dec. 8, 1959 |
| 2,994,864 | Van Allen | Aug. 1, 1961 |